(12) United States Patent
Zhou et al.

(10) Patent No.: US 10,786,112 B2
(45) Date of Patent: Sep. 29, 2020

(54) COFFEE MACHINE WITH LEAK PREVENTING DEVICE AND WORKING METHOD THEREFOR

(71) Applicant: CONWIDE TECHNOLOGY CO., LTD., Guangzhou, Guangdong (CN)

(72) Inventors: Linbin Zhou, Guangdong (CN); Xuebin Wang, Guangdong (CN)

(73) Assignee: CONWIDE TECHNOLOGY CO., LTD., Guangzhou (CN)

( * ) Notice: Subject to any disclaimer, the term of this patent is extended or adjusted under 35 U.S.C. 154(b) by 233 days.

(21) Appl. No.: 15/570,372

(22) PCT Filed: Apr. 28, 2016

(86) PCT No.: PCT/CN2016/080578
§ 371 (c)(1),
(2) Date: Oct. 30, 2017

(87) PCT Pub. No.: WO2016/173517
PCT Pub. Date: Nov. 3, 2016

(65) Prior Publication Data
US 2018/0146820 A1 May 31, 2018

(30) Foreign Application Priority Data

Apr. 28, 2015 (CN) .................... 2015 2 0261466 U

(51) Int. Cl.
*A47J 31/58* (2006.01)
*A47J 31/42* (2006.01)
(Continued)

(52) U.S. Cl.
CPC ................ *A47J 31/58* (2013.01); *A23F 5/08* (2013.01); *A23F 5/26* (2013.01); *A47J 31/42* (2013.01); *A47J 31/4403* (2013.01)

(58) Field of Classification Search
CPC .. A47J 31/00; A47J 31/18; A47J 31/20; A47J 31/24; A47J 31/42; A47J 31/40; A47J 31/106; A23F 5/08
(Continued)

(56) References Cited

U.S. PATENT DOCUMENTS

2007/0137495 A1* 6/2007 Talbert ................... A47J 31/42
99/286

OTHER PUBLICATIONS

Machine Translation, CN201905734 (Year: 2011).*
Machine Translation CN203138096 (Year: 2013).*

* cited by examiner

*Primary Examiner* — Erik Kashnikow
*Assistant Examiner* — Lela S. Williams

(57) ABSTRACT

A coffee machine with a leak preventing device includes a main body, a chamber for containing liquid and coffee particles, a grinding assembly for grinding coffee particles, and a driving mechanism for driving the grinding assembly. The chamber is provided in the main body and the grinding assembly is provided in the chamber. The driving mechanism is provided with a driving shaft. A driving shaft hole is provided in a bottom of the chamber. The driving shaft is detachably connected to the grinding assembly through the driving shaft hole. The leak preventing device is provided at a position corresponding to the driving shaft hole and the leak preventing device is arranged to close the driving shaft hole when the driving shaft is detached from the driving shaft hole. In addition, a working method for the coffee machine with the leak preventing device is also provided.

8 Claims, 15 Drawing Sheets

(51) Int. Cl.
*A23F 5/08* (2006.01)
*A23F 5/26* (2006.01)
*A47J 31/44* (2006.01)

(58) Field of Classification Search
USPC .................. 99/282, 283, 285, 286, 293, 297
See application file for complete search history.

COFFEE MACHINE WITH LEAK PREVENTING DEVICE AND WORKING METHOD THEREFOR

TECHNICAL FIELD

The present invention relates to the technical field of beverage preparation equipment and in particular, to a coffee machine for brewing coffee and a working method therefor.

BACKGROUND

Some coffee machines available in the market comprises a main body, a chamber for containing liquid and coffee particles, a grinding assembly for grinding coffee particles, and a driving mechanism for driving the grinding assembly. The chamber is provided in the main body and the driving mechanism is provided with a driving shaft. The driving shaft of such coffee machine can only be provided outside the chamber and the grinding assembly is inserted through the chamber and is connected with the driving shaft, which causes a more complex structure of the coffee machine. If the grinding assembly is provided in the chamber and driving shaft is inserted into a bottom of the chamber and is connected with the grinding assembly, liquid in the chamber would be leaked from the bottom of the chamber when the driving shaft is detached from the chamber.

SUMMARY OF THE INVENTION

In order to overcome the defects of the prior art, one object of the present invention to provide a coffee machine with a leak preventing device which allows a driving shaft of the coffee machine to be inserted into a chamber. And the leak preventing device can prevent liquid from being leaked from a bottom of the chamber when the driving shaft is detached from the chamber.

To achieve the above-mentioned object, a coffee machine with a leak preventing device is provided which comprises a main body, a chamber for containing liquid and coffee particles, a grinding assembly for grinding coffee particles, and a driving mechanism for driving the grinding assembly. The chamber is provided in the main body. The grinding assembly is provided in the chamber. The driving mechanism is provided with a driving shaft and a driving shaft hole is provided in a bottom of the chamber. The driving shaft is detachably connected to the grinding assembly through the driving shaft hole. The leak preventing device is provided at a position corresponding to the driving shaft hole. The leak preventing device is arranged to close the driving shaft hole when the driving shaft is detached from the driving shaft hole. In the present embodiment, the chamber and the grinding assembly may be detached from the driving shaft, such that the chamber and the grinding assembly can be taken out from the main body, which facilitates the cleaning of the chamber and the grinding assembly. When the driving shaft is detached from the driving shaft hole, the driving shaft hole is closed by the leak preventing device so as to prevent the leak of liquid from the driving shaft hole.

In one embodiment, the chamber is provided with a brewing chamber and a leak preventing chamber located at a lower side of the brewing chamber. The grinding assembly is inserted through a bottom of the brewing chamber. The leak preventing chamber is provided with the driving shaft hole. The leak preventing chamber is used for collecting coffee liquid leaked from a gap between the grinding assembly and the bottom of the brewing chamber. The leak preventing chamber is provided with a diversion port for discharging coffee liquid from the leak preventing chamber. The chamber is provided with the leak preventing device at the driving shaft hole, and the leak preventing device is arranged to close the driving shaft hole when the driving shaft is detached from the driving shaft hole. As coffee liquid leaked from the gap between the grinding assembly and the bottom of the brewing chamber can be collected into the leak preventing chamber, the gap between the grinding assembly and the bottom of the brewing chamber may be retained and needn't to be sealed.

In a preferred embodiment, the grinding assembly comprises a blade and a blade shaft, and a blade shaft hole is provided in the bottom of the brewing chamber. The blade shaft is inserted through the blade shaft hole. One end of the blade shaft located inside the brewing chamber is connected to the blade. Another end of the blade shaft located outside the brewing chamber is detachably connected to the driving shaft such that the blade shaft is driven to be rotated by the driving mechanism. An interval is provided between the blade shaft and the blade shaft hole such that the friction between the blade shaft and the blade shaft hole is reduced. When the blade shaft is rotated, the greater friction between the blade shaft and the blade shaft hole would lead to the louder noise generated by the friction. Thus, the interval that is larger enough between the blade shaft and the blade shaft hole can greatly reduce the noise generated by rotation of blade shaft.

In a more preferred embodiment, the grinding assembly further comprises a collecting chamber, and the brewing chamber is provided with a first filter for filtering coffee liquid in the brewing chamber. The collecting chamber is communicated with the brewing chamber such that coffee liquid filtered by the first filter is flowed into the collecting chamber. The collecting chamber is communicated with the leak preventing chamber via the diversion port. The collecting chamber is provided with a discharge port. Coffee liquid in the leak preventing chamber may be flowed into the collecting chamber via the diversion port to avoid the wasting of coffee liquid. In the present embodiment, coffee liquid from the collecting chamber is discharged via the discharge port such that it can be enjoyed by a user. A valve is provided at the discharge port to control the discharge of coffee liquid.

In one embodiment, the leak preventing device comprises an elastic mechanism which is arranged to provide an elastic force such that the driving shaft hole is blocked by at least a portion of the elastic mechanism so as to prevent coffee liquid from being flowed out of the driving shaft hole, when the driving shaft is detached from the driving shaft hole.

In a preferred embodiment, the elastic mechanism comprises a movable first blocking member and first elastic members provided on both sides of the first blocking member. The first blocking member is provided at a position corresponding to the driving shaft hole. The first elastic members provided on both sides of the first blocking member is connected to the first blocking member respectively such that the driving shaft hole is blocked by the first blocking member when the driving shaft is detached from the driving shaft hole. When the driving shaft is inserted into the driving shaft hole, the first blocking member is pushed by the driving shaft such that the driving shaft hole is not blocked by the first blocking member. When the driving shaft is pulled out from the driving shaft hole, the first blocking member is pushed to block the driving shaft hole by the first elastic members provided on both sides of the first blocking member. In the present embodiment, the first blocking member is a sphere, such that the first blocking member is tightly engaged with the driving shaft hole to prevent the leak of liquid, when the driving shaft hole is blocked by the first blocking member. It is contemplated that the first blocking member may have a different shape suitable for a tight engagement with the driving shaft hole. For example, the blocking member may be a conical body.

In a preferred embodiment, the elastic mechanism comprises a rotatable second blocking member, a rotary shaft, a driving member and a second elastic member. A first end of the rotary shaft is connected to the second blocking member. A second end of the rotary shaft is detachably connected to the driving member. The second blocking member is connected to the second elastic member, such that the second blocking member is rotated around the rotary shaft so as to block the driving shaft hole when the driving shaft is detached from the driving shaft hole. The second blocking member and the rotary shaft are capable of being driven to be rotated by the driving member such that the second blocking member is moved away from the driving shaft hole. Specifically, the rotary shaft is arranged to be inserted through a bottom of the leak preventing chamber and to be located at a position adjacent to the driving shaft hole. The driving member is provided at a position corresponding to the second end of the rotary shaft at a lower side of the leak preventing chamber. The driving member has a driving inclined surface. A lower end of the rotary shaft has a rotary shaft inclined surface corresponding to the driving inclined surface. When the chamber is moved downwardly such that the driving shaft hole is reached by the driving shaft, the driving inclined surface is in frictional contact with the rotary shaft inclined surface and the rotary shaft inclined surface is moved downwardly to push the rotary shaft and the second blocking member to be rotated such that the driving shaft hole is blocked, and that the second elastic member is pulled to be deformed by the second blocking member. When the chamber is moved upwardly to detach the driving shaft from the driving shaft hole, the rotary shaft inclined surface is moved together with the chamber and is detached from the driving inclined surface. As the friction between the driving inclined surface and rotary shaft inclined surface disappears, the rotary shaft and the second blocking member are pulled to be rotated by the deformed second elastic member such that the driving shaft hole is blocked by the second blocking member.

In a preferred embodiment, the elastic mechanism is an elastic assembly. A first end of the elastic assembly is elastically provided at a position corresponding to the driving shaft hole. A second end of the elastic assembly is capable of being elastically rotated around the first end of the elastic assembly such that the second end of the elastic assembly is deformed. Specifically, the elastic assembly comprises a third blocking member and a third elastic member located at a position corresponding to the driving shaft hole. A first end of the third blocking member is rotatably provided at the bottom of the leak preventing chamber. A second end of the third blocking member is capable of being rotated around the first end of the third blocking member. The third elastic member is abutted against the third blocking member. When the chamber is moved downwardly such that the driving shaft hole is reached by the driving shaft, the third blocking member is driven to be turned around its first end by the driving shaft to push the third elastic member to be deformed, and thus the driving shaft can be connected to the grinding assembly through the driving shaft hole. When the chamber is moved upwardly to detach the driving shaft from the driving shaft hole, the third blocking member is pulled to be turned around its first end by the deformed third elastic member such that the driving shaft hole is blocked by the third blocking member.

In a preferred embodiment, the elastic mechanism is an elastic single piece provided at a position corresponding to the driving shaft hole. A middle portion of the elastic single piece is provided with at least one cutout, and the elastic single piece is capable of being deformed by extrusion such that the cutout is opened. When the chamber is moved downwardly such that the driving shaft hole is reached by the driving shaft, the elastic single piece is extruded by the driving shaft such that the cutout is opened, and thus the driving shaft can be connected to the grinding assembly through the cutout. When the chamber is moved upwardly to detach the driving shaft from the driving shaft hole, the cutout is closed and thus the driving shaft hole is closed so as to prevent the leak of coffee liquid from the driving shaft hole.

In a preferred embodiment, the leak preventing device comprises a movable fourth blocking member and an accommodating element for accommodating the fourth blocking member. The accommodating element is provided with a groove. A bottom of the groove is communicated with the driving shaft hole. The groove has an inclined surface extending upwardly from the bottom of the groove. The fourth blocking member is capable of being moved freely along the inclined surface. When the chamber is moved downwardly such that the driving shaft hole is reached by the driving shaft, the fourth blocking member is pushed to be moved upwardly along the inclined surface from the bottom of the groove by the driving shaft, and thus driving shaft can be connected to the grinding assembly through the driving shaft hole. When the chamber is moved upwardly to detach the driving shaft from the driving shaft hole, the fourth blocking member is moved along the inclined surface to the bottom of the groove under the action of gravity, so as to block the driving shaft hole and to prevent the leak of coffee liquid from the driving shaft hole.

In a more preferred embodiment, in order that the fourth blocking member can be moved quickly to the bottom of the groove when the driving shaft is detached from the driving shaft hole, the inclined surface is provided with an elastic limiting member. An elastic force is provided by the elastic limiting member to define the fourth blocking member in the bottom of the groove such that the driving shaft hole is blocked by the fourth blocking member, when the driving shaft is detached from the driving shaft hole.

Another object of the present invention is to provide a working method for the coffee machine.

The working method for the coffee machine comprises the following steps:

a. manually or automatically adding coffee particles to the chamber;

b. actuating the driving mechanism, such that the grinding assembly is driven by the driving mechanism to grind the coffee particles so as to obtain the coffee powder;

c. manually or automatically adding hot water to the chamber, such that hot water and coffee powder are mixed together to form coffee liquid;

d. the driving shaft being detached from the driving shaft hole and the driving shaft hole being closed by the leak preventing device, when the chamber is taken out from the main body;

e. the driving shaft hole being opened by the leak preventing device and the driving shaft being connected to the grinding assembly through the driving shaft hole, when the chamber is mounted into the main body.

The present invention has following advantages:

The coffee machine of the present invention has the leak preventing device which allows the driving shaft of the coffee machine to be inserted into the chamber. And the leak preventing device can prevent liquid being leaked from the bottom of the chamber when the driving shaft is detached from the chamber.

DETAILED DESCRIPTION OF THE PREFERRED EMBODIMENT

The present invention is further described with reference to the accompanying drawings. The accompanying drawings are only for exemplary description, and shall not be construed as limiting the patent. In order to better illustrate the embodiments of the present invention, some parts are omitted, zoomed in or out in the accompanying drawings, but do not represent the actual size of the product. It is understandable for those skilled in the art that some known structures and the description thereof may be omitted in the accompanying drawings.

Embodiment 1

Figure 1:
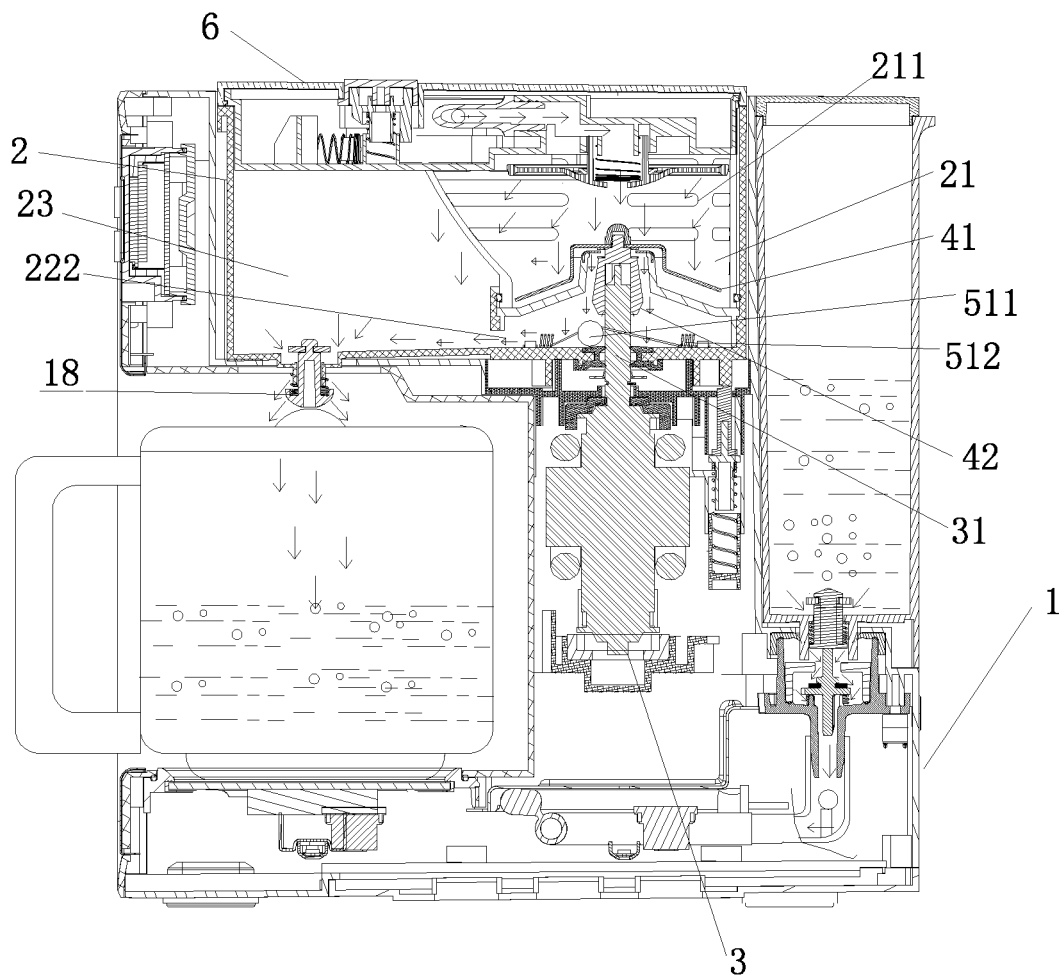
FIG. 1 is a schematic cross-sectional view of a coffee machine according to embodiment 1 of the present invention, which shows a state in which a driving shaft is inserted through a driving shaft hole.
Figure 2:
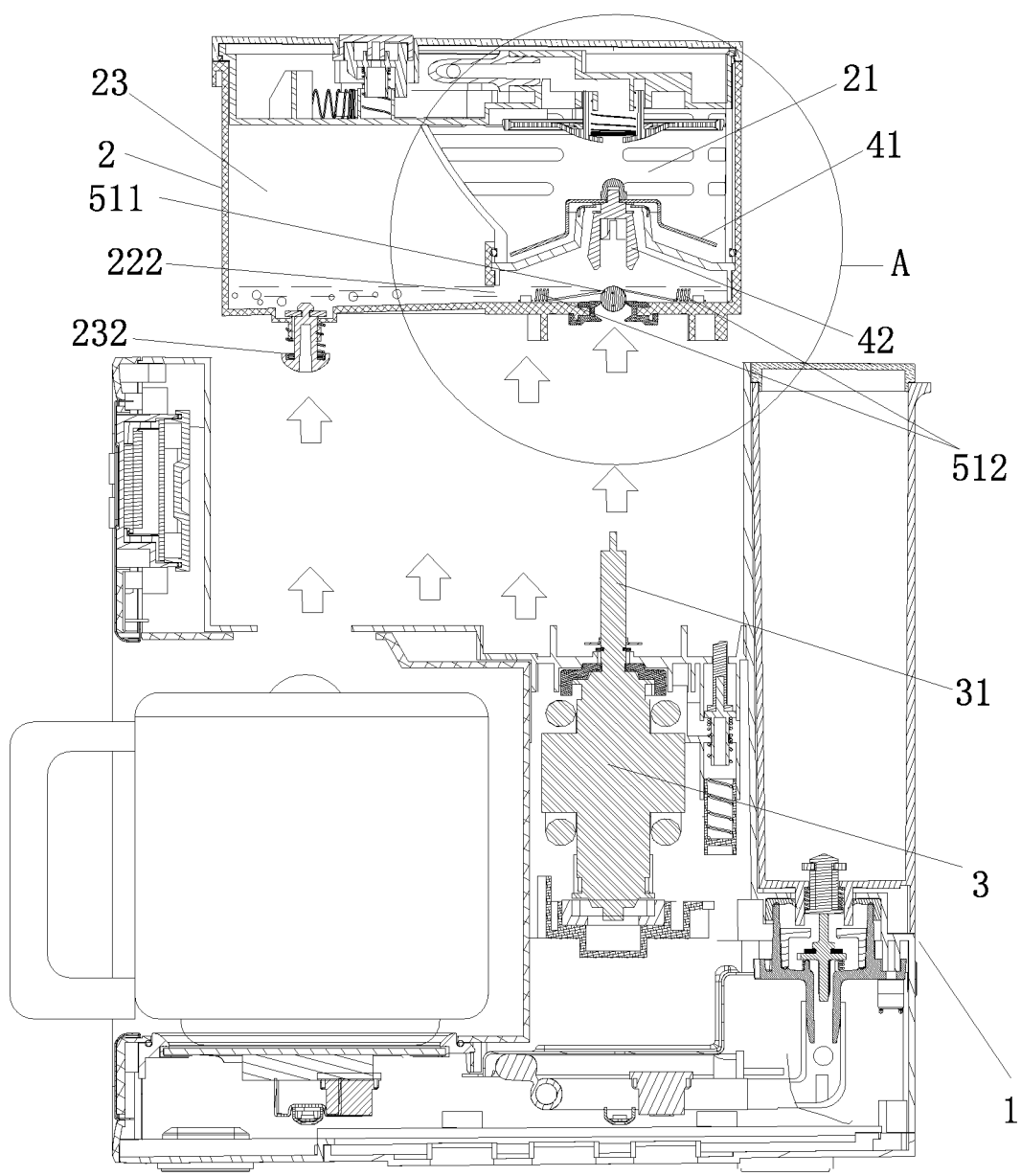
FIG. 2 is a schematic cross-sectional view of the coffee machine according to embodiment 1 of the present invention, which shows a state in which the driving shaft is detached from the driving shaft hole.
Figure 3:
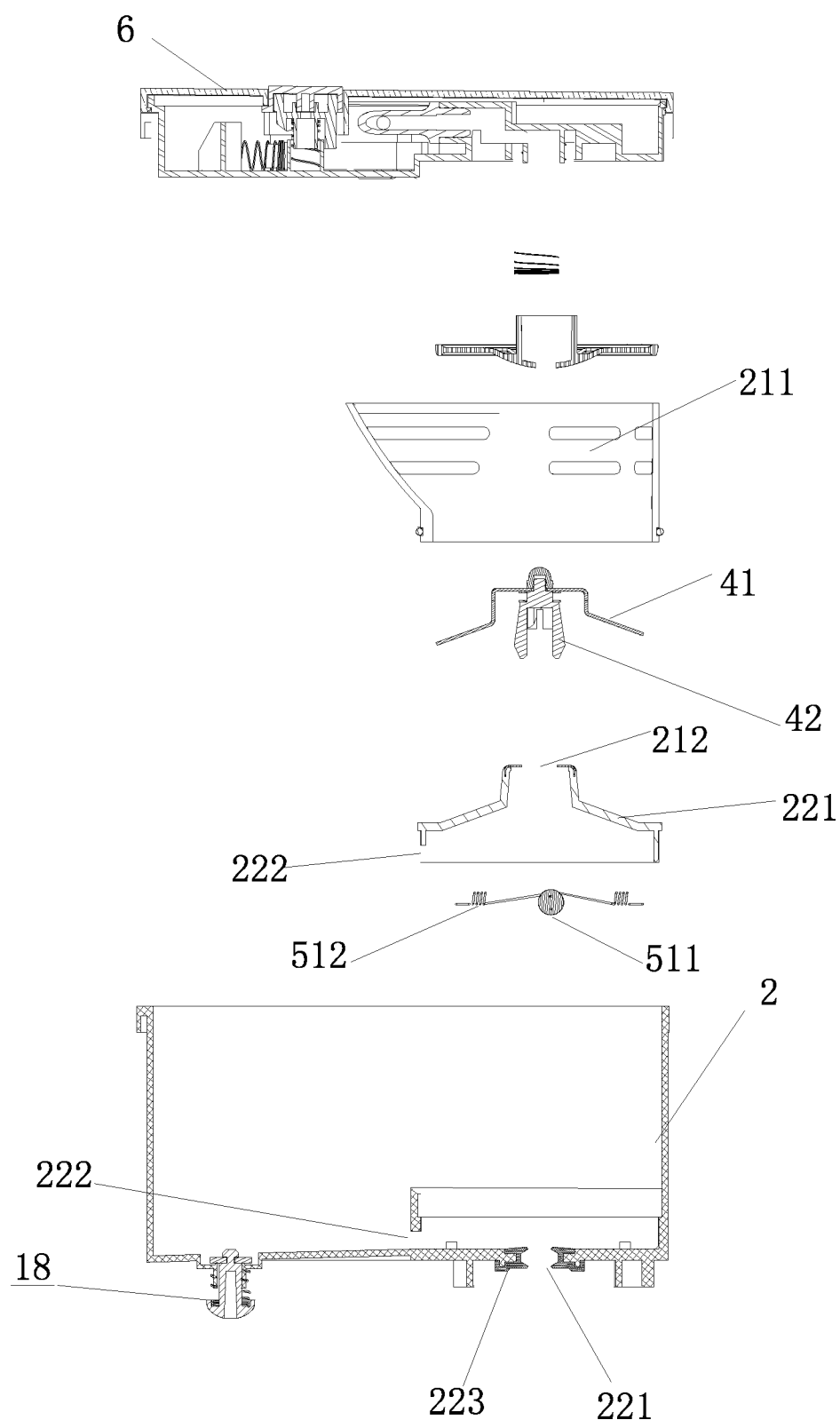
FIG. 3 is a schematic exploded view of a part of the coffee machine according to embodiment 1 of the present invention.
Figure 4:
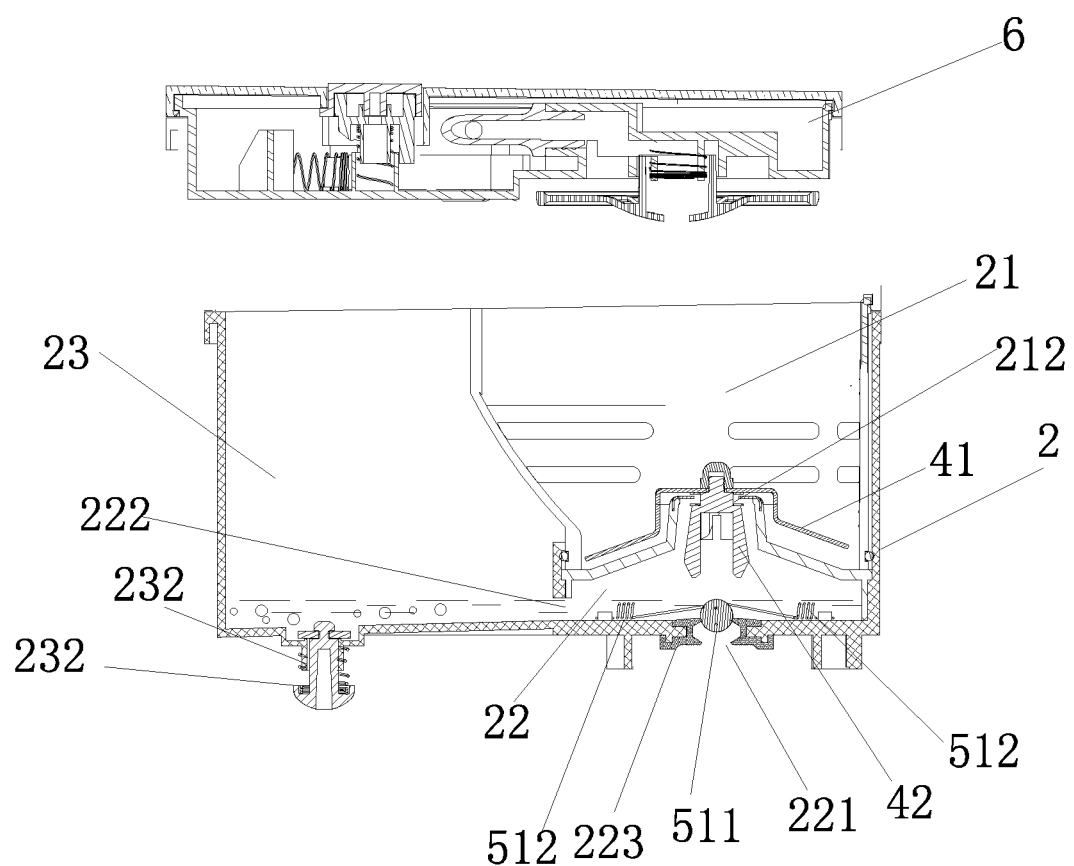
FIG. 4 is a schematic cross-sectional view of a chamber and an upper lid of the coffee machine according to embodiment 1 of the present invention.
Figure 5:
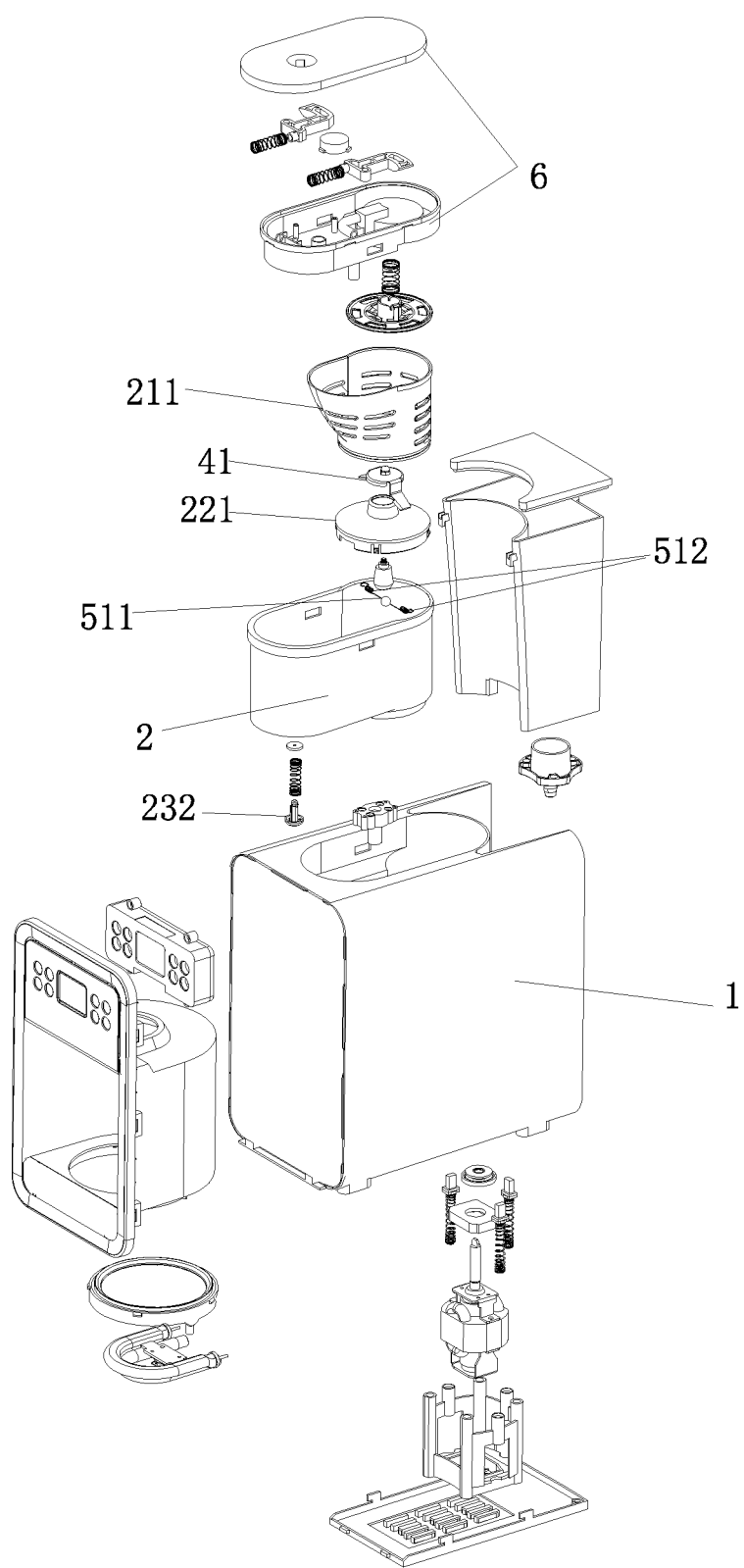
FIG. 5 is a schematic exploded view of the coffee machine according to embodiment 1 of the present invention.
Figure 6:
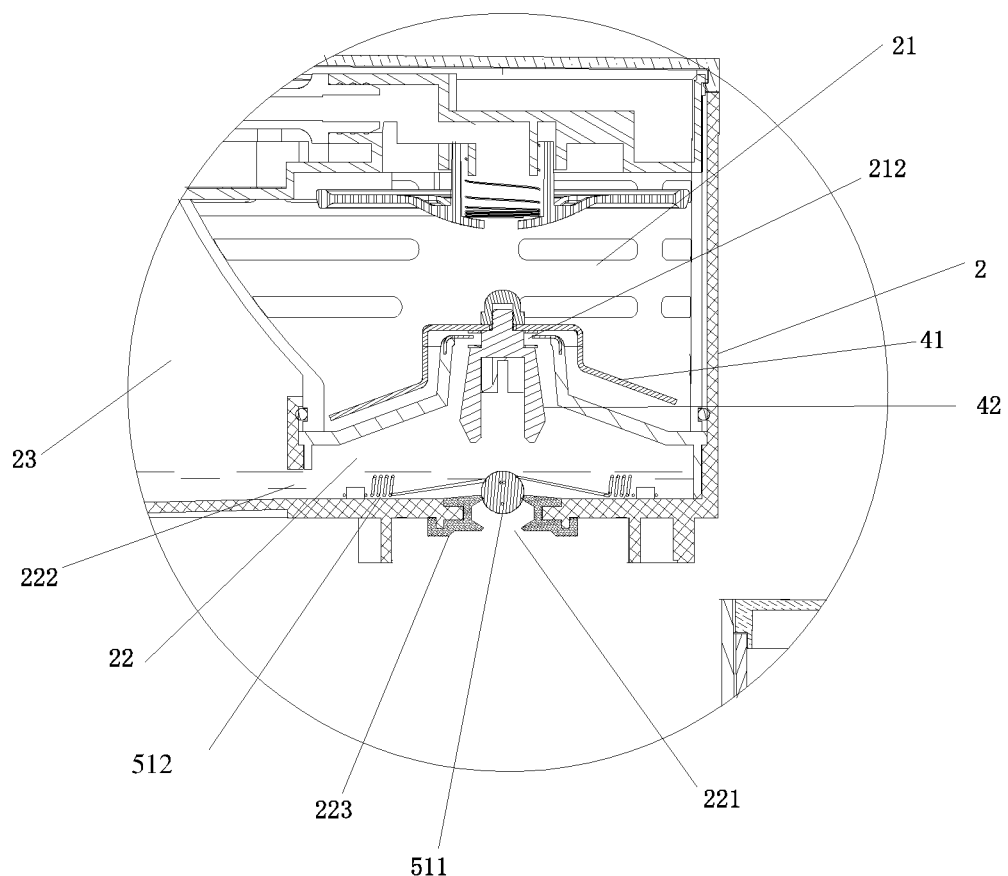
FIG. 6 is an enlarged schematic structural view of part A shown in FIG. 2.

As shown in FIGS. 1 and 2, a coffee machine with a leak preventing device in the present embodiment, comprises a main body 1 which has a main body opening at a top of the main body 1, a brewing device for brewing coffee and a water supply device for supplying hot water to the brewing device. The brewing device comprises a chamber 2 for containing liquid and coffee particles, an upper lid 6, a grinding assembly for grinding coffee particles, a motor 3 connected to the grinding assembly and for driving the grinding assembly, and a first filter 211 for filtering coffee liquid. The chamber has an open top and the upper lid 6 is used for the open top. In this embodiment, the chamber 2 is placed into the main body 1 through the main body opening 11 and is engaged with the main body 1. The chamber 2 comprises a brewing chamber 21 and a collecting chamber 23. Referring to FIGS. 1 to 4, in the present embodiment, the first filter 211 has a cylindrical shape with a plurality of filter holes in its side wall, and the first filter 211 is provided with an open top and a bottom. A leak preventing chamber 22 has a leak preventing housing 221 which is mounted in a bottom of the chamber 2. The first filter 211 overlaps the top of the leak preventing housing 221 and forms, jointly with the top of the leak preventing housing 221, a brewing chamber 21 in the chamber 2. The collecting chamber 23 is jointly formed by an outer wall of the first filter 211, an outer wall of the leak preventing housing 221 and chamber 2. The collecting chamber 23 is communicated with the filter holes in the brewing chamber 21 and the first filter 211 is located higher than the collecting chamber 23, and thus coffee liquid filtered by the first filter 211 can be flowed into the collecting chamber 23 through the filter holes. A blade shaft hole 212 is provided in a bottom of the brewing chamber 21, i.e., the top of the leak preventing housing 221. A blade shaft 42 is inserted through the blade shaft hole 212. One end of the blade shaft 42 located inside the brewing chamber 21 is connected to a blade 41, and another end of the blade shaft 42 located outside the brewing chamber 21 is detachably connected to the driving shaft 31 such that the blade shaft 42 is driven to be rotated by the driving mechanism 3. An interval is provided between the blade shaft 42 and the blade shaft hole 212 such that the friction between the blade shaft 42 and the blade shaft hole 212 is reduced. When the motor 3 is actuated, the blade shaft 42 and the blade 41 are driven to be rotated by the motor 3, and coffee beans in the brewing chamber are ground to be coffee powder in the end by the blade 41. When the coffee is brewed in the brewing chamber 21, the water supply device may provide hot water for the brewing chamber 21, and coffee powder and hot water are mixed to form coffee liquid.

Referring to FIGS. 1 to 6, the leak preventing chamber 22 is provided with a diversion port 222 which is communicated with the leak preventing chamber 22, and coffee liquid leaked from the interval between the blade shaft 42 and the blade shaft hole 212 may be flowed into the leak preventing chamber 22. A bottom of the collecting chamber 23 is provided with a discharge port 231. The discharge port 231 is provided with a valve 232 for controlling the discharge of coffee liquid from the collecting chamber 23. For further filtering of coffee liquid, a second filter (which is not shown) is provided in the collecting chamber 23 to filter coffee liquid again.

The leak preventing device is provided at a position corresponding to the driving shaft hole 221 (i.e., the shaft hole 221 at the bottom of the chamber 2) at a bottom of leak preventing chamber 22. The driving shaft hole 221 is provided with a seal member 223 which is made from a flexible material. In the present embodiment, the leak preventing device comprises a movable first blocking member 511 and two first elastic members 512 which are provided on both sides of the first blocking member 511 respectively. The first blocking member 511 is provided at a position corresponding to the driving shaft hole 221. The two first elastic members 512 are connected to the first blocking member 511, respectively. The two first elastic members 512 are symmetrically disposed at an inner bottom of the leak preventing chamber 22 and are fixed on both sides of the driving shaft hole 221. One end of each of the first elastic members 512 which is adjacent to the driving shaft hole 221 is connected to the first blocking member, respectively. The first blocking member is a sphere, and the first elastic members 512 are springs 512. The driving shaft hole 221 is covered by the first blocking member and a lower portion of the first elastic members 512 is inserted through the driving shaft hole 221 and engaged with the seal member 223, due to an elastic force from the springs 512 at the both sides of the springs 512 onto the first blocking member. When the chamber 2 is moved downwardly such that the driving shaft hole 221 is reached by the driving shaft 31, the first blocking member 511 is pushed away from the driving shaft hole 221 by the driving shaft 31 and is abutted against a side wall of the driving shaft 31. Thus the driving shaft 31 may be connected to the grinding assembly through the driving shaft hole 221. When the chamber 2 is moved upwardly, the driving shaft 31 is pulled out from the driving shaft hole 221, and the first blocking member 511 abutted against the side wall of the driving shaft 31 is pulled and moved to cover the driving shaft hole 221.

A working method for the coffee machine of the present embodiment comprises the following steps:

a. manually or automatically adding coffee particles to the chamber 2;

b. actuating the driving mechanism 3, such that the grinding assembly is driven by the driving mechanism 3 to grind the coffee particles so as to obtain coffee powder;

c. manually or automatically adding hot water to the chamber 2, such that hot water and coffee powder are mixed together to form coffee liquid;

d. the driving shaft 31 being detached from the driving shaft hole 221 and the driving shaft hole 221 being closed by the leak preventing device, when the chamber 2 is taken out from the main body 1;

e. the driving shaft hole 221 being opened by the leak preventing device and the driving shaft 31 being connected to the grinding assembly through the driving shaft hole 221, when the chamber 2 is mounted into the main body 1.

Embodiment 2

Figure 7:
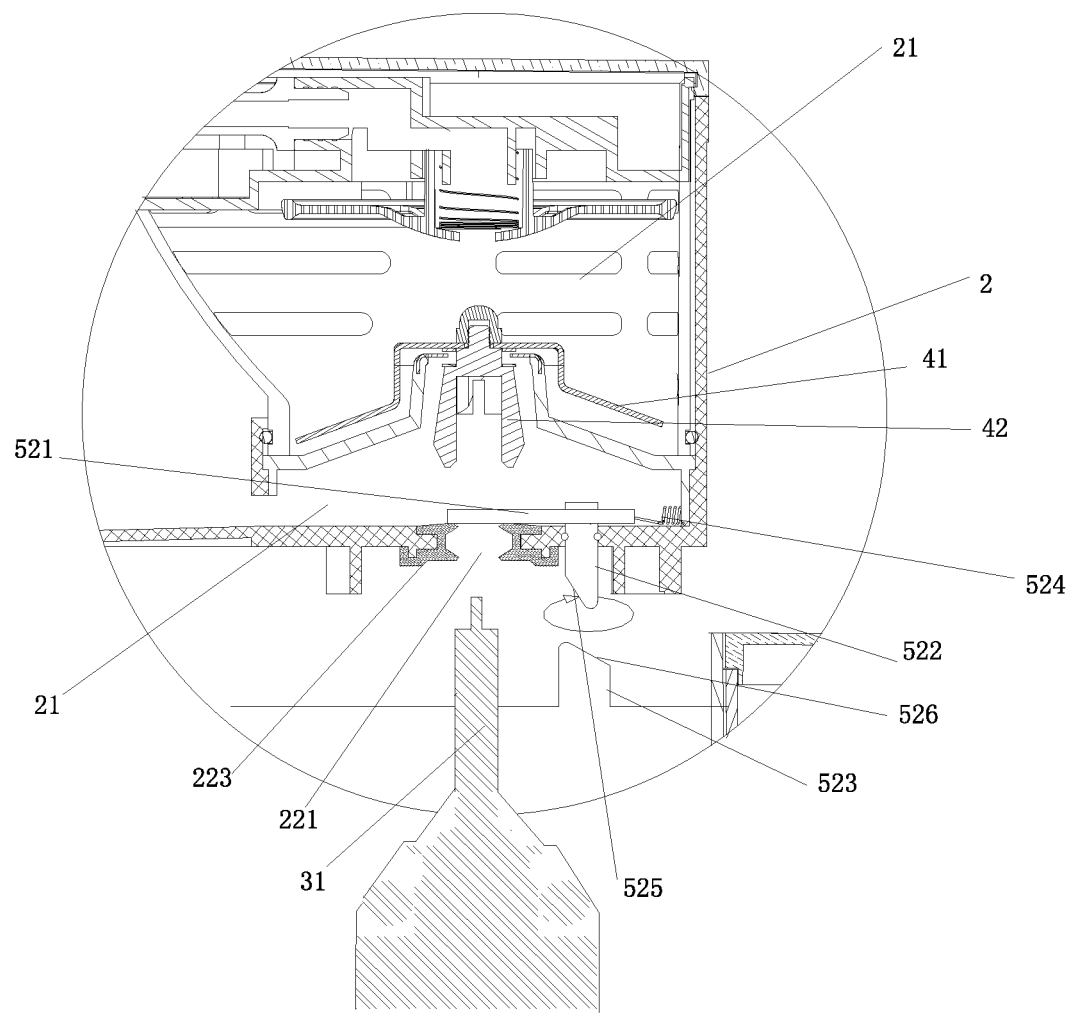
FIG. 7 is a schematic exploded view of a part of a coffee machine according to embodiment 2 of the present invention, which shows a state in which a driving shaft is detached from a driving shaft hole.
Figure 8:
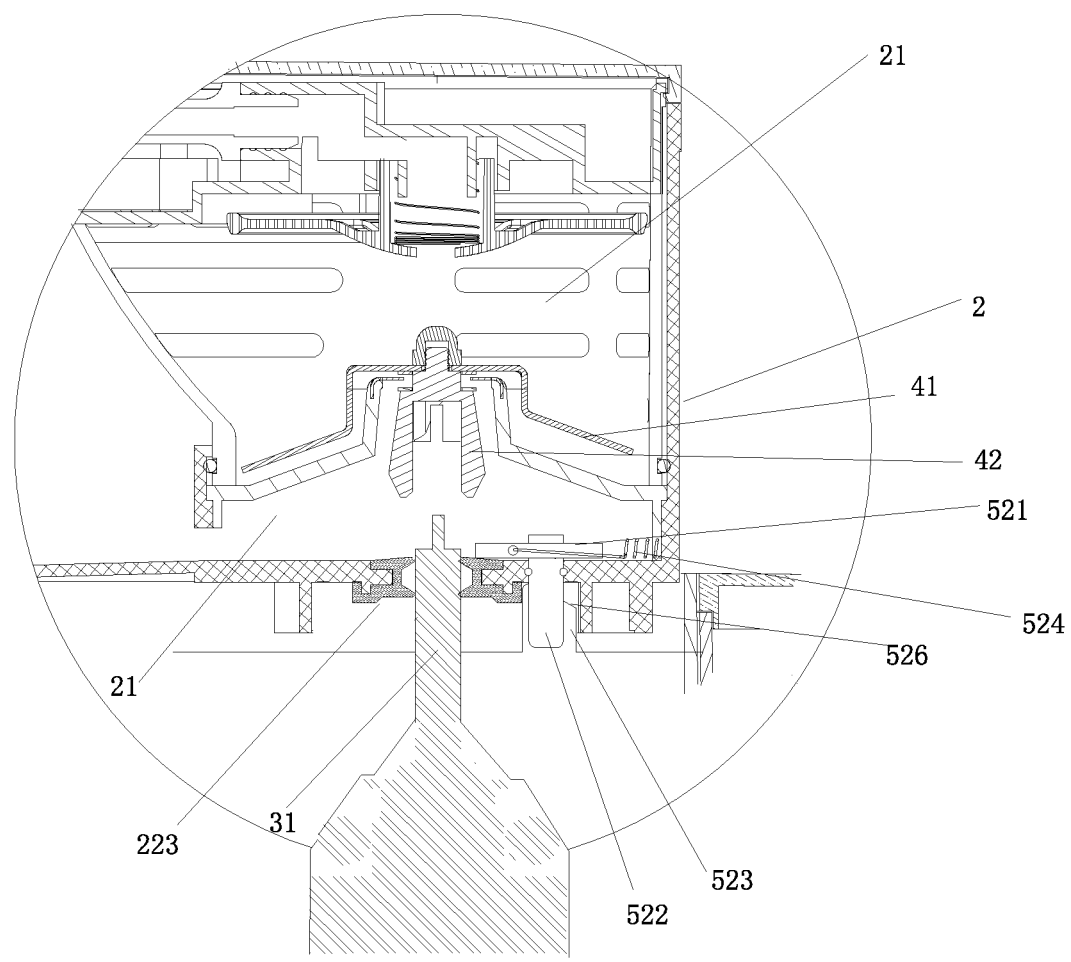
FIG. 8 is a schematic exploded view of a part of the coffee machine according to embodiment 2 of the present invention, which shows a state in which the driving shaft is inserted through the driving shaft hole.

The present embodiment is substantially the same as that of Embodiment 1 except that the structure of the leak preventing device is different. As shown in FIG. 7 and FIG. 8, the leak preventing device comprises a rotatable second blocking member 521, a rotary shaft 522, a driving member 523 and a second elastic member 524. A first end of the rotary shaft 522 is connected to the second blocking member 521 and a second end of the rotary shaft 522 is detachably connected to the driving member 523 such that the second blocking member 521 is rotated around the rotary shaft 522 so as to block the driving shaft hole 221 when the driving shaft 31 is detached from the driving shaft hole 221. The second blocking member 521 and rotary shaft 522 is capable of being driven to be rotated by the driving member 523 such that the second blocking member 521 is moved away from the driving shaft hole 221. In the present embodiment, the second elastic member 524 is a spring 524. Specifically, the rotary shaft 522 is arranged to be inserted through the bottom of the leak preventing chamber 22 and to be located at a position adjacent to the driving shaft hole. The driving member 523 is provided at a position corresponding to the second end of the rotary shaft 522 at a lower side of the leak preventing chamber 22. The driving member 523 has a driving inclined surface 526. A second end of the rotary shaft 522 has a rotary shaft inclined surface 525 corresponding to the driving inclined surface 526. When the chamber 2 is moved downwardly such that the driving shaft hole 221 is reached by the driving shaft 31, the driving inclined surface 526 is in frictional contact with the rotary shaft inclined surface 525, and the rotary shaft inclined surface 525 is moved downwardly to drive the rotary shaft 522 and the second blocking member 521 to be rotated such that the driving shaft hole 221 is blocked, and that the second elastic member 524 is pulled to be deformed by the second blocking member 521. When the chamber 2 is moved upwardly to detach the driving shaft 31 from the driving shaft hole, the rotary shaft inclined surface 525 is moved together with the chamber 2 and is detached from the driving inclined surface 526. As the friction between the driving inclined surface 526 and rotary shaft inclined surface 525 disappears, the rotary shaft 522 and the second blocking member 521 are driven to be rotated by the deformed second elastic member 524 such that the driving shaft hole 221 is blocked by the second blocking member 521.

Embodiment 3

Figure 9:
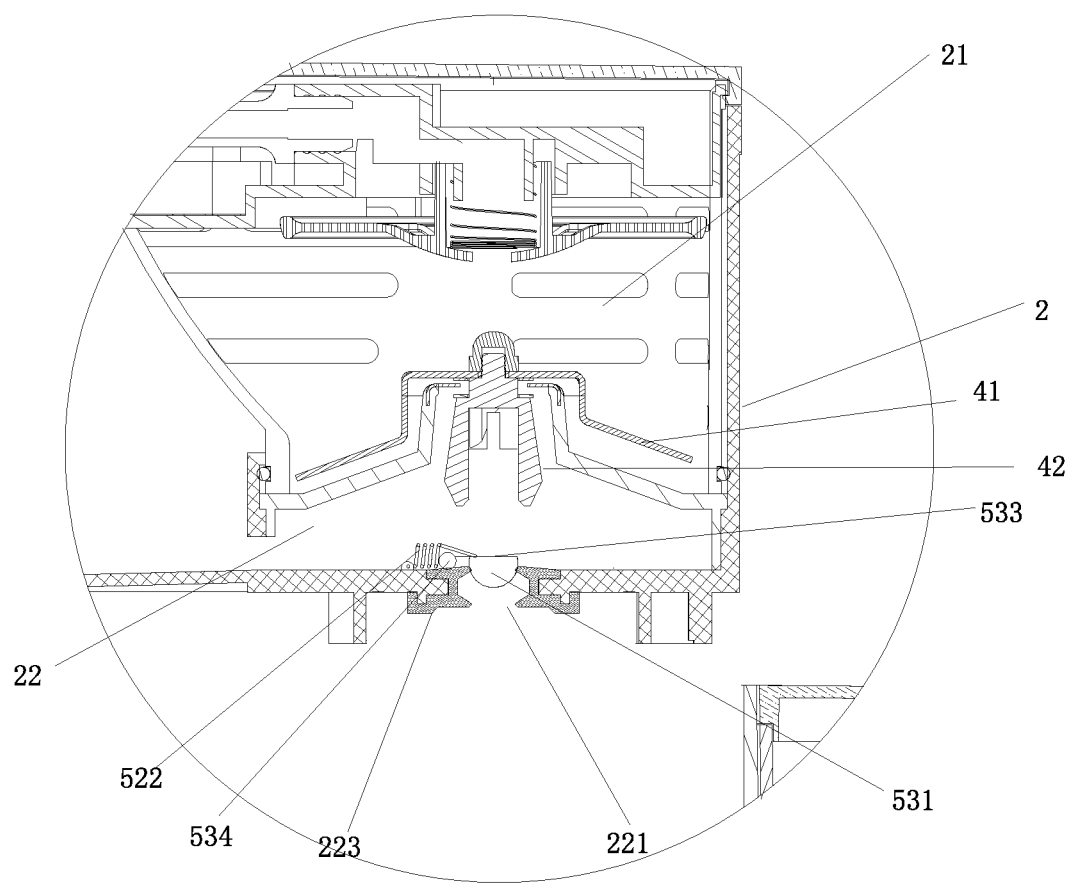
FIG. 9 is a schematic exploded view of a part of a coffee machine according to embodiment 3 of the present invention, which shows a state in which a driving shaft is detached from a driving shaft hole.
Figure 10:
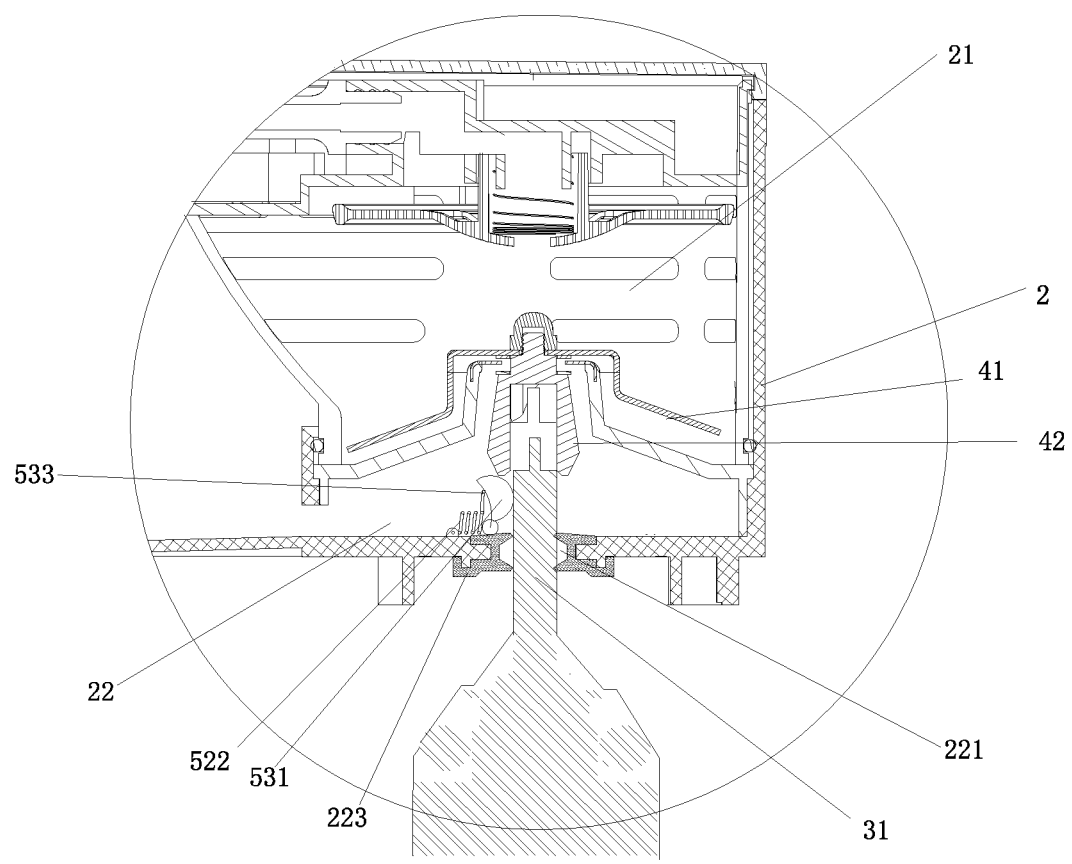
FIG. 10 is a schematic exploded view of a part of the coffee machine according to embodiment 3 of the present invention, which shows a state in which the driving shaft is inserted through the driving shaft hole.

The present embodiment is substantially the same as that of Embodiment 1 except that the structure of the leak preventing device is different. As shown in FIG. 9 and FIG. 10, the leak preventing device comprises a third blocking member 531 and a third elastic member 532 located at a position corresponding to the driving shaft hole 221. A first end of the third blocking member 531 is rotatably provided at the bottom of the leak preventing chamber 22 via a rotary shaft 534 such that a second end of the third blocking member 531 is capable of being rotated around the first end of the third blocking member 531. The third elastic member 532 is fixed at the bottom of the leak preventing chamber 22 and the other end of the third elastic member 532 is abutted against an upper surface 533 of the third blocking member 531. When the chamber is moved downwardly such that the driving shaft hole 221 is reached by the driving shaft 31, the third blocking member 531 is upwardly turned around its first end by the driving shaft 31 to push the third elastic member 532 to be deformed, and thus the driving shaft 31 can be connected to the grinding assembly through the driving shaft hole 221. When the chamber 2 is moved upwardly to detach the driving shaft 31 from the driving shaft hole 221, the third blocking member 531 is pulled to be downwardly turned around its first end by the deformed third elastic member 532 such that the driving shaft hole 221 is blocked by the third blocking member 531.

Embodiment 4

Figure 11:
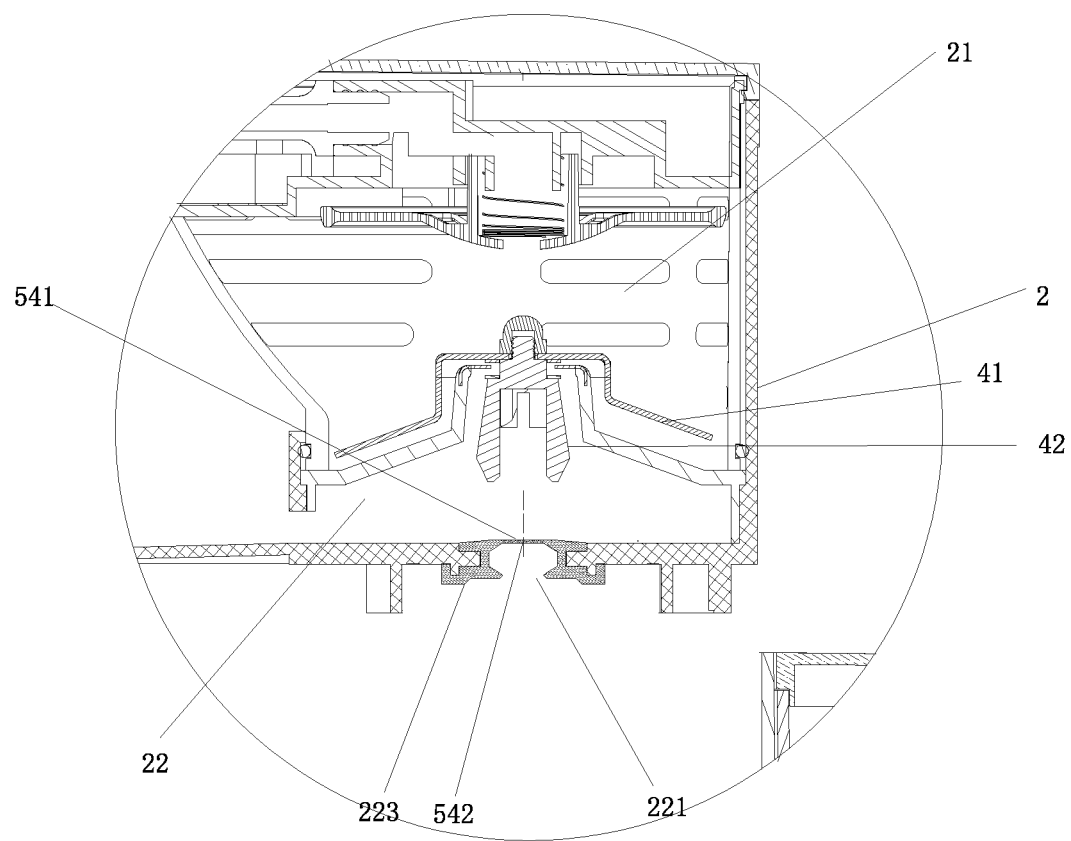
FIG. 11 is a schematic exploded view of a part of a coffee machine according to embodiment 4 of the present invention, which shows a state in which a driving shaft is detached from a driving shaft hole.
Figure 12:
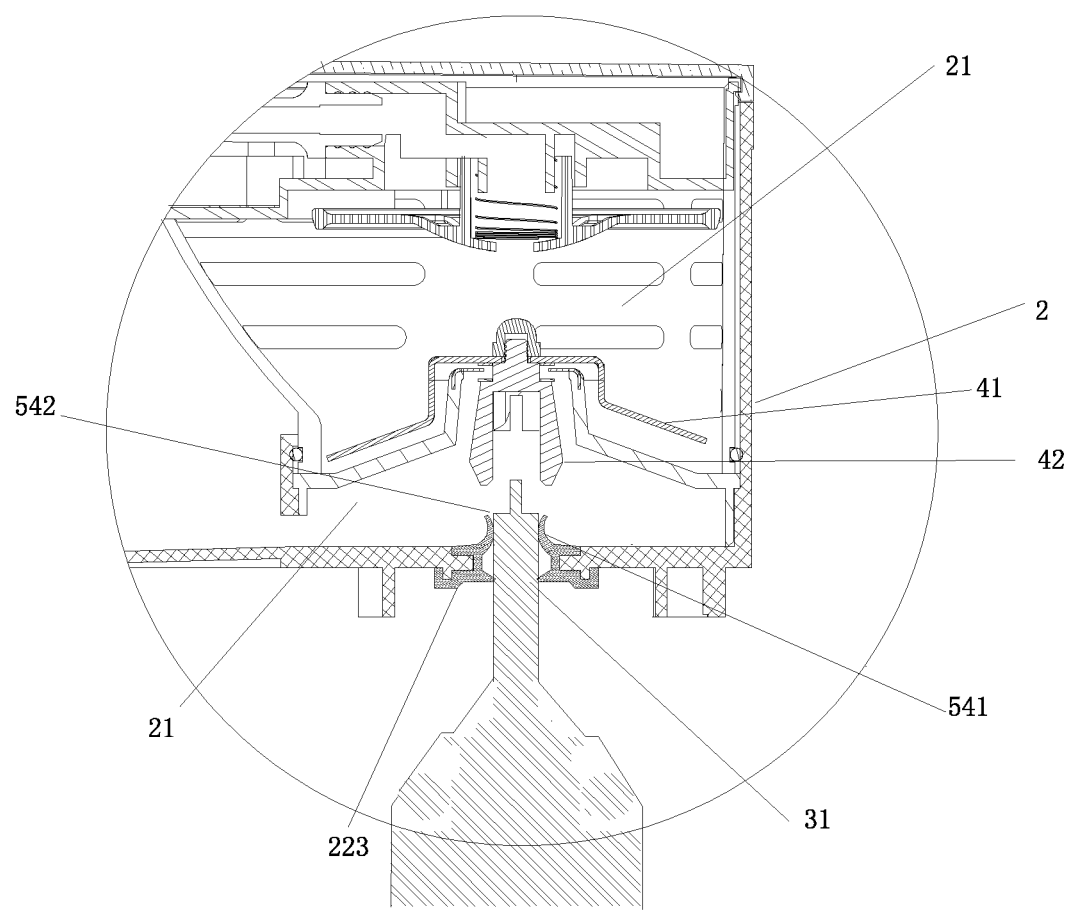
FIG. 12 is a schematic exploded view of a part of the coffee machine according to embodiment 4 of the present invention, which shows a state in which the driving shaft is inserted through the driving shaft hole.

The present embodiment is substantially the same as that of Embodiment 1 except that the structure of the leak preventing device is different. As shown in FIG. 11 and FIG. 12, the leak preventing device is an elastic single piece 541 provided at a position corresponding to the driving shaft hole 221. A middle portion of the elastic single piece 541 is provided with a cutout 542. The driving shaft hole 221 is covered by the elastic single piece 541 which is formed to be sheet-like structure. In the present embodiment, the elastic single piece 541 and the seal member 223 are formed in one piece, and both of them are made from flexible material. When the chamber 2 is moved downwardly such that the driving shaft hole 221 is reached by the driving shaft 31, the elastic single piece 541 is extruded by the driving shaft 31 such that the cutout 542 is opened, and thus driving shaft 31 can be connected to the grinding assembly through the cutout 542. When the chamber 2 is moved upwardly to detach the driving shaft 31 from the driving shaft hole 221, the cutout 542 is closed and thus the driving shaft hole 221 is closed so as to prevent the leak of coffee liquid from the driving shaft hole 221.

Embodiment 5

Figure 13:
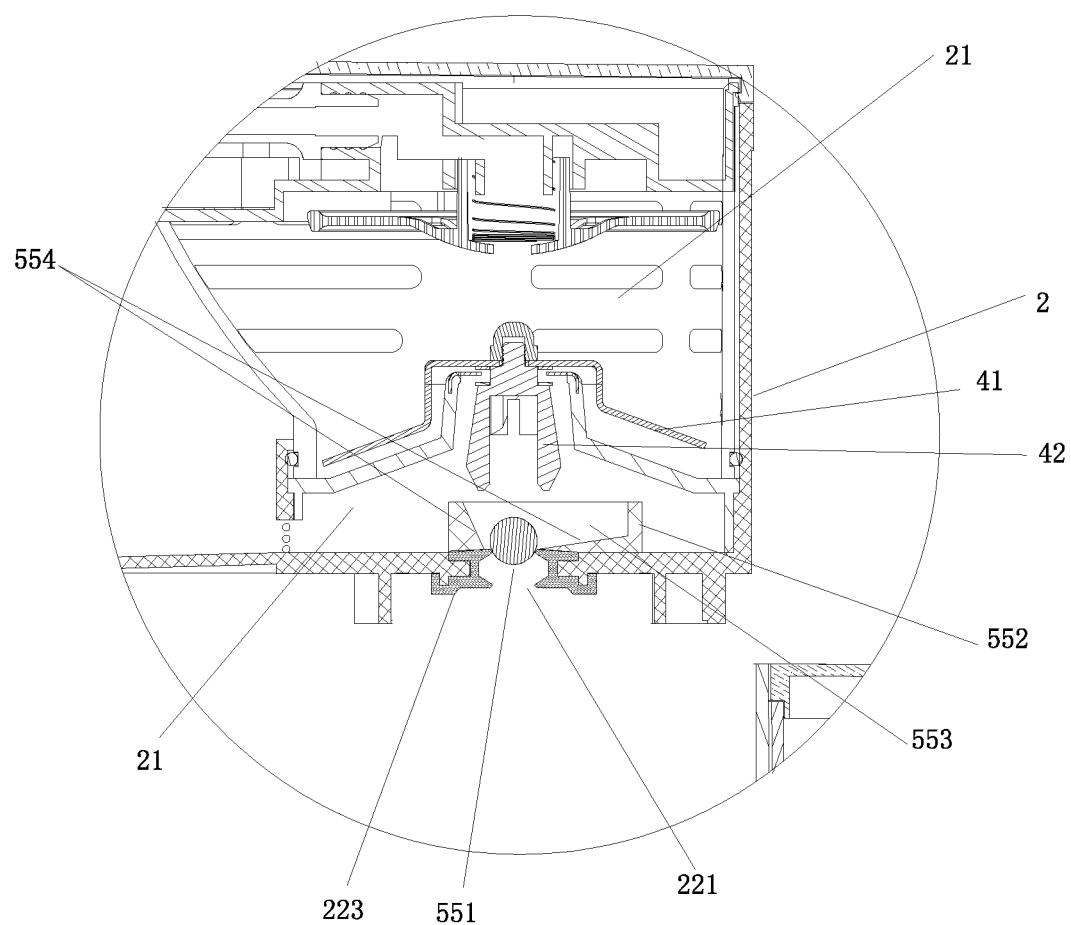
FIG. 13 is a schematic exploded view of a part of a coffee machine according to embodiment 5 of the present invention, which shows a state in which a driving shaft is detached from a driving shaft hole.
Figure 14:
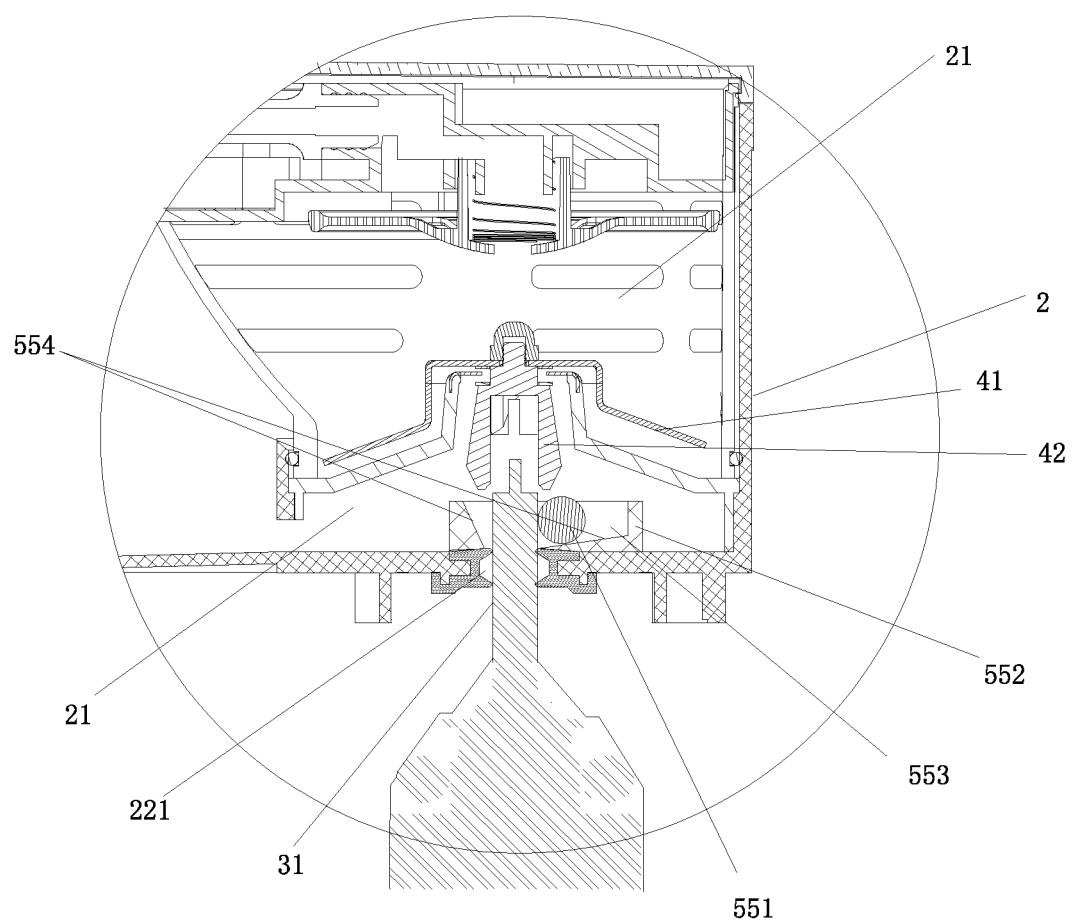
FIG. 14 is a schematic exploded view of a part of the coffee machine according to embodiment 5 of the present invention, which shows a state in which the driving shaft is inserted through the driving shaft hole.

The present embodiment is substantially the same as that of Embodiment 1 except that the structure of the leak preventing device is different. As shown in FIG. 13 and FIG. 14, the leak preventing device comprises a movable fourth blocking member 551 and an accommodating element 552 for accommodating the fourth blocking member 551. The accommodating element 552 is located at the inner bottom of leak preventing chamber 22. The accommodating element 552 is provided with a groove 553. A bottom of the groove 553 is communicated with the driving shaft hole 221. The groove 553 has an inclined surface 554 extending upwardly from the bottom of the groove 553. The fourth blocking member 551 is capable of being moved freely along the inclined surface 554. In the present embodiment, the fourth blocking member 551 is a sphere such that it can be rolled along the inclined surface 554. When the chamber 2 is moved downwardly such that the driving shaft 31 the driving shaft hole 221 is reached by the driving shaft 31, the fourth blocking member 551 is pushed to be rolled upwardly along the inclined surface 554 from the bottom of the groove 553 by the driving shaft 31, and thus the driving shaft 31 can be connected to the grinding assembly through the driving shaft hole 221. When the chamber 2 is moved upwardly to detach the driving shaft 31 from the driving shaft hole 221, the fourth blocking member 551 is moved along the inclined surface 554 to the bottom of the groove 553 under the action of gravity so as to block the driving shaft hole 221, and a lower portion of the fourth blocking member 551 is inserted into the driving shaft hole 221 and engaged with the seal member 223.

Embodiment 6

Figure 15:
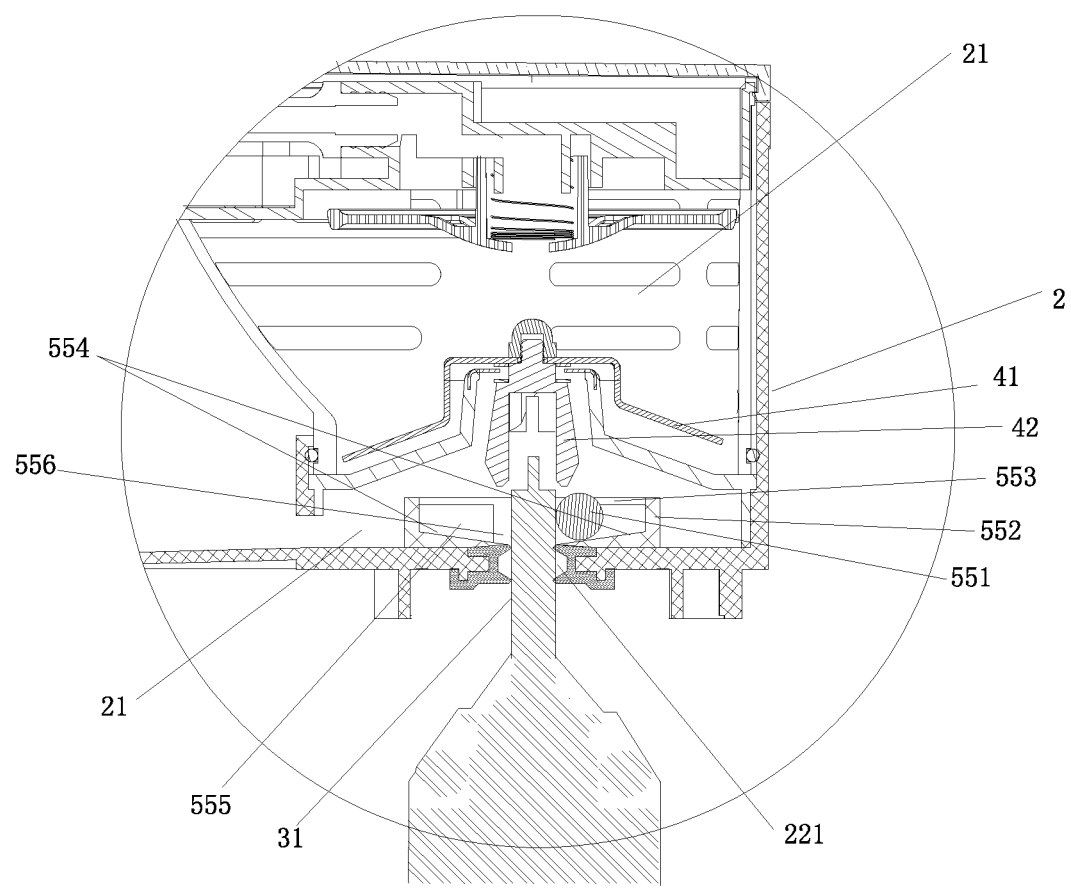
FIG. 15 is a schematic exploded view of a part of a coffee machine according to embodiment 6 of the present invention, which shows a state in which a driving shaft is inserted through a driving shaft hole.

The present embodiment is substantially the same as that of Embodiment 5 except that the leak preventing device is provided with an elastic limiting member 555 in the present embodiment. As shown in FIG. 15, the elastic limiting member 555 has a cylindrical shape and a middle portion of the elastic limiting member 555 is provided with a limiting through hole 556 which is located on an upper side of the driving shaft hole 221 and is communicated with the driving shaft hole 221. The fourth blocking member 551 is located within the limiting through hole 556. When the chamber 2 is moved downwardly such that the driving shaft hole 221 is reached by the driving shaft 31, the fourth blocking member 551 is pushed to be rolled upwardly along the inclined surface 554 from the bottom of the groove by the driving shaft 31 and the elastic limiting member 555 is extruded by the fourth blocking member 551 to be deformed. Thus, the driving shaft 31 can be connected to the grinding assembly through the driving shaft hole 221. When the chamber 2 is moved upwardly to detach the driving shaft 31 from the driving shaft hole 221, the fourth blocking member 551 is pushed to be moved along the inclined surface 554 to the bottom of the groove 553 by the deformed the fourth blocking member 551 so as to block the driving shaft hole 221, and the lower portion of the fourth blocking member 551 is inserted into the driving shaft hole 221 and engaged with the seal member 223.

What is claimed is:

1. A coffee machine with a leak preventing device, comprising a main body (1), a chamber (2) for containing liquid and coffee particles, a grinding assembly for grinding coffee particles, and a driving mechanism (3) for driving the grinding assembly, the chamber (2) being provided in the main body (1), wherein, the grinding assembly is provided in the chamber (2), the driving mechanism (3) is provided with a driving shaft (31), and a driving shaft hole (221) is provided in a bottom of the chamber (2), the driving shaft (31) being detachably connected to the grinding assembly through the driving shaft hole (221), wherein the leak preventing device is provided at a position corresponding to the driving shaft hole (221), the leak preventing device being arranged to close the driving shaft hole (221) when the driving shaft (31) is detached from the driving shaft hole (221);

wherein the chamber (2) is provided with a brewing chamber (21) and a leak preventing chamber (22) located at a lower side of the brewing chamber (21), the grinding assembly being inserted through a bottom of the brewing chamber (21), the leak preventing chamber (22) being provided with the driving shaft hole (221), the leak preventing chamber (22) being used for collecting coffee liquid leaked from a gap between the grinding assembly and the bottom of the brewing chamber (21), the leak preventing chamber (22) being provided with a diversion port (222) for discharging coffee liquid from the leak preventing chamber (22); and wherein the chamber (2) is provided with the leak preventing device at the driving shaft hole (221), the leak preventing device being arranged to close the driving shaft hole (221) when the driving shaft (31) is detached from the driving shaft hole (221);

wherein the grinding assembly comprises a blade (41) and a blade shaft (42), and a blade shaft hole (212) is provided in the bottom of the brewing chamber (21), the blade shaft (42) being inserted through the blade shaft hole (212), one end of the blade shaft (42) located inside the brewing chamber (21) being connected to the blade (41), another end of the blade shaft (42) located outside the brewing chamber (21) being detachably connected to the driving shaft (31) such that the blade shaft (42) is driven to be rotated by the driving mechanism (3), and an interval being provided between the blade shaft (42) and the blade shaft hole (212) such that the friction between the blade shaft (42) and the blade shaft hole (212) is reduced;

wherein the grinding assembly further comprises a collecting chamber (23), and the brewing chamber (21) is provided with a filter (211) for filtering coffee liquid in the brewing chamber (21), the collecting chamber (23) being communicated with the brewing chamber (21) such that coffee liquid filtered by the filter (211) is flowed into the collecting chamber (23), the collecting chamber (23) being communicated with the leak preventing chamber (22) via the diversion port (222) the collecting chamber (23) being provided with a discharge port (231).

2. The coffee machine according to claim 1, wherein the leak preventing device comprises an elastic mechanism which is arranged to provide an elastic force such that the driving shaft hole (221) is blocked by at least a portion of the elastic mechanism when the driving shaft (31) is detached from the driving shaft hole (221).

3. The coffee machine according to claim 2, wherein the elastic mechanism comprises a movable blocking member (511) and elastic members (512) provided on both sides of the movable blocking member (511), the movable blocking member (511) being provided at a position corresponding to the driving shaft hole (221), the elastic members (512) provided on both sides of the movable blocking member (511) being connected to the movable blocking member (511) respectively such that the driving shaft hole (221) is blocked by the movable blocking member (511) when the driving shaft (31) is detached from the driving shaft hole (221).

4. The coffee machine according to claim 2, wherein the elastic mechanism comprises a rotatable blocking member (521), a rotary shaft (522), a driving member (523) and an elastic member (524), a first end of the rotary shaft (522) being connected to the rotatable blocking member (521), a second end of the rotary shaft (522) being detachably connected to the driving member (523), the rotatable blocking member (521) being connected to the elastic member (524) such that the rotatable blocking member (521) is rotated around the rotary shaft (522) so as to block the driving shaft hole (221) when the driving shaft (31) is detached from the driving shaft hole (221), the rotatable blocking member (521) and the rotary shaft (522) being capable of being driven to be rotated by the driving member (523) such that the rotatable blocking member (521) is moved away from the driving shaft hole (221).

5. The coffee machine according to claim 2, wherein the elastic mechanism is an elastic assembly, a first end of the elastic assembly being elastically provided at a position corresponding to the driving shaft hole (221), a second end of the elastic assembly being capable of being elastically rotated around the first end of the elastic assembly such that the second end of the elastic assembly is deformed.

6. The coffee machine according to claim 2, wherein the elastic mechanism is an elastic single piece (541) provided at a position corresponding to the driving shaft hole (221), the elastic single piece (541) being provided with at least one cutout (542), the elastic single piece (541) being capable of being deformed by extrusion such that the cutout (542) is opened.

7. The coffee machine according to claim 1, wherein the leak preventing device comprises a movable blocking member (551) and an accommodating element (552) for accommodating the movable blocking member (551), the accommodating element (552) being provided with a groove (553), a bottom of the groove (553) being communicated with the driving shaft hole (221), the groove (553) having an inclined surface (554) extending upwardly from the bottom of the groove (553), the movable blocking member (551) being capable of being moved freely along the inclined surface (554).

8. The coffee machine according to claim 7, wherein the accommodating element (552) is provided with an elastic limiting member (555), an elastic force is provided by the elastic limiting member (555) to define the movable blocking member (551) in the bottom of the groove (553) such that the driving shaft hole (221) is blocked by the movable blocking member (551), when the driving shaft (31) is detached from the driving shaft hole (221).

* * * * *